United States Patent [19]

Adamson

[11] 4,428,358
[45] Jan. 31, 1984

[54] SOLAR SKYLIGHT

[76] Inventor: James C. Adamson, Osprey La., Rumson, N.J. 07760

[21] Appl. No.: 335,062

[22] Filed: Dec. 28, 1981

[51] Int. Cl.³ .............................................. F24J 3/02
[52] U.S. Cl. .................................... 126/417; 126/439; 126/428; 126/450; 350/260; 52/80; 52/200
[58] Field of Search ............... 126/450, 439, 428, 417; 350/258-265; 52/18, 80, 200

[56] References Cited

U.S. PATENT DOCUMENTS

| | | | |
|---|---|---|---|
| 2,857,634 | 10/1958 | Garbade et al. | 350/263 X |
| 3,709,583 | 1/1973 | Pfannkuch et al. | 350/262 X |
| 3,884,414 | 5/1975 | Baer | 236/49 |
| 4,121,764 | 10/1978 | Hope et al. | 126/429 |
| 4,212,289 | 7/1980 | Hebert | 126/428 |
| 4,223,662 | 9/1980 | Lunde et al. | 126/450 X |
| 4,232,731 | 11/1980 | Kaplow et al. | 126/430 X |
| 4,309,981 | 1/1981 | Briggs et al. | 126/439 X |
| 4,337,754 | 7/1982 | Conger | 126/439 X |

OTHER PUBLICATIONS

Lakin et al., "Road Map to the Stars: Teaching an Integrated Approach to Energy Conserving Design".

Primary Examiner—Larry Jones
Attorney, Agent, or Firm—Richard C. Woodbridge

[57] ABSTRACT

A reflective shutter rotates within a skylight housing in such a fashion as to control solar energy thereby providing a combination of heating, lighting, and ventilation. The skylight housing has three faces: a glazed southern face, a glazed northern face, and an open downwardly oriented face to the interior of the structure. Counter-weighted pivot arms support the shutter at either end causing the center of rotation to pass through the center of gravity. The shutter has three basic positions: In the first position, during the winter day, the shutter closes off the northern face, allowing solar energy to enter directly into the supporting structure providing heat gain and daylighting. In the second position, during the winter night, the shutter closes off the open face to the interior, providing insulation between the structure and the skylight housing. In the third position, during the non-heating season, the shutter closes off the southern face blocking unwanted heat gain but allowing diffuse northern light to penetrate for daylighting. In this last position, a means is provided for ventilating by natural convection. The apparatus can be operated either manually or by motor.

8 Claims, 6 Drawing Figures

SOLAR SKYLIGHT

GOVERNMENT RIGHTS

The Government of the United States of America has rights in this invention pursuant to Grant No. FG-42-80R205133 awarded by the U.S. Department of Energy.

BACKGROUND OF THE INVENTION

1. Field of the Invention

This invention relates to a solar control device, and in particular to an apparatus for maximizing solar daylight, solar heat gain and heat retention in a structure during winter, and for providing ventilation and diffuse daylighting during the summer.

2. Description of the Prior Art

In the past, when non-renewable energy sources were relatively inexpensive, buildings used north facing skylights to provide the best natural lighting and also to provide apertures for ventilation. In recent years, with the advent of energy shortages, skylights are being oriented to face south and take advantage of the available solar energy. However, in order to provide a net heat gain in winter such skylights must be insulated at night. In order to accomplish night time insulation the prior art discloses the use of thermal blankets on rollers, rigid panels on hinges, beads blown in to the space between panes of glass, etc. U.S. Pat. No. 3,884,414 issued to Stephen Baer describes a relevant technique employing pivoted panels. Such solar control components primarily address one aspect of the total problem, namely, night time thermal insulation. In general they do not provide ventilation or daylighting during the non-heating season because they generally should be closed to prevent excessive heat gain. One interesting approach is described as a "Sun Scoop" and disclosed at the Sixth National Passive Solar Conference. Page 502 of those materials describes the "Sun Scoop" which was taken from a disclosure entitled "Road Map to the Stars: Teaching an Integrated Approach to Energy Conserving Design" by Joel E. Lakin and Marietta S. Millet, Department of Architecture, JO-20, University of Washington, Seattle, Wash. 98105. That particular device employed a rotating concave shutter that was concerned more with non-direct lighting than with direct lighting. A significant amount of energy loss is experienced if the natural direct light of the sun is not used to its fullest advantages.

SUMMARY OF THE INVENTION

Briefly described, the present invention comprises an apparatus for effective year round control of solar energy. It allows for light and heating in the winter and light and ventilation in the summer. The apparatus preferably comprises an insulated and reflective panel or shutter which rotates within a skylight housing. The skylight has three faces: a glazed northern face, a glazed southern face, and a downwardly oriented open face which is directed towards the interior of the structure upon which the apparatus is mounted. The shutter is supported at either end by pivot arms. The pivot arms move about a pivot axis which is the center of an equilateral triangle that is defined by the three basic panel positions. The arms are counter-weighted so that the system is substantially balanced during rotation. In position 1, during the winter day, the panel allows penetration of solar energy, providing direct heat gain and lighting to the interior of the structure. In position 2, during the winter night, the panel is positioned across the opening between the skylight and the structure, providing insulation against heat loss. In position 3, during the summer, the panel blocks the southern face, preventing unwanted solar heat gain, but allowing diffuse northern light to penetrate the structure for natural daylighting. This last position allows the rising heated air from the interior of the structure to pass to the outside via vents in the skylight housing.

The foregoing invention will be more fully understood with reference to the following drawings and detailed description of the invention.

DETAILED DESCRIPTION OF THE INVENTION

Figure 1:
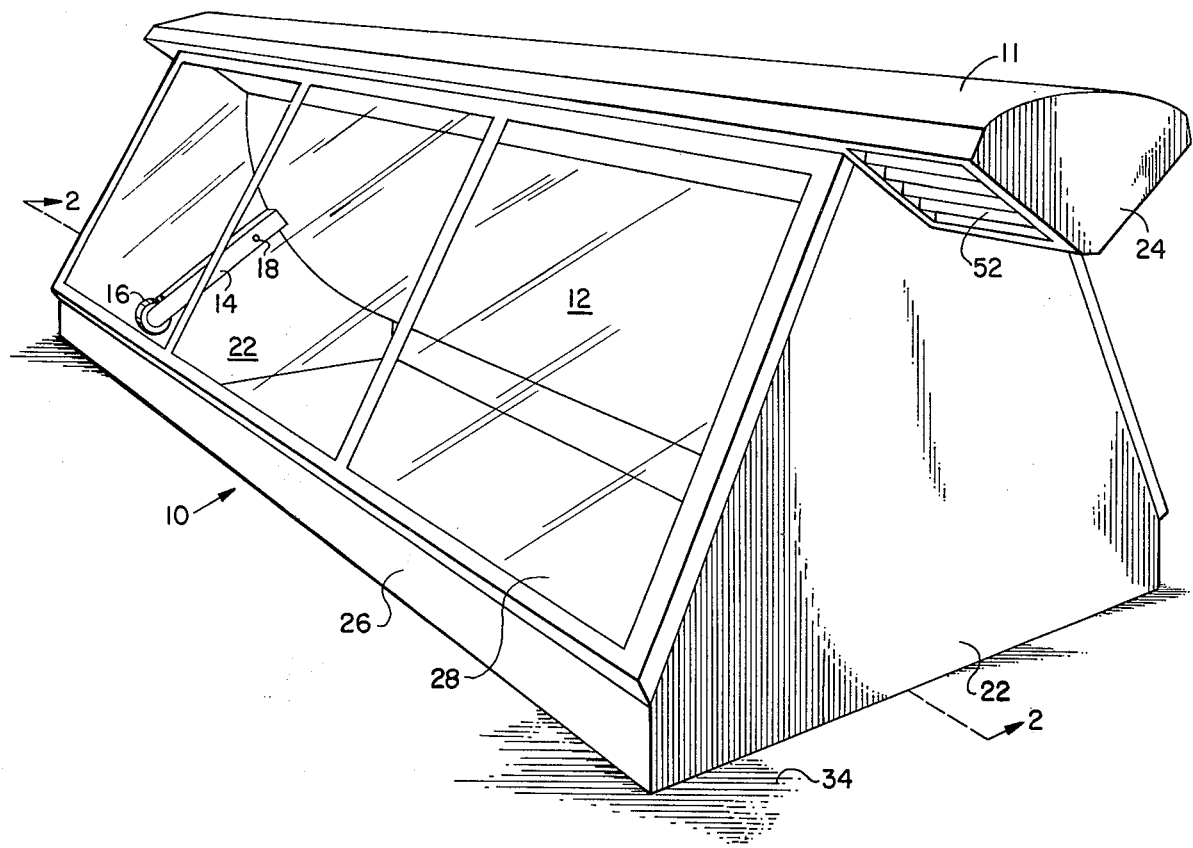
FIG. 1 is a perspective view of the preferred embodiment of the invention as viewed from the roof of a structure.
Figure 2:
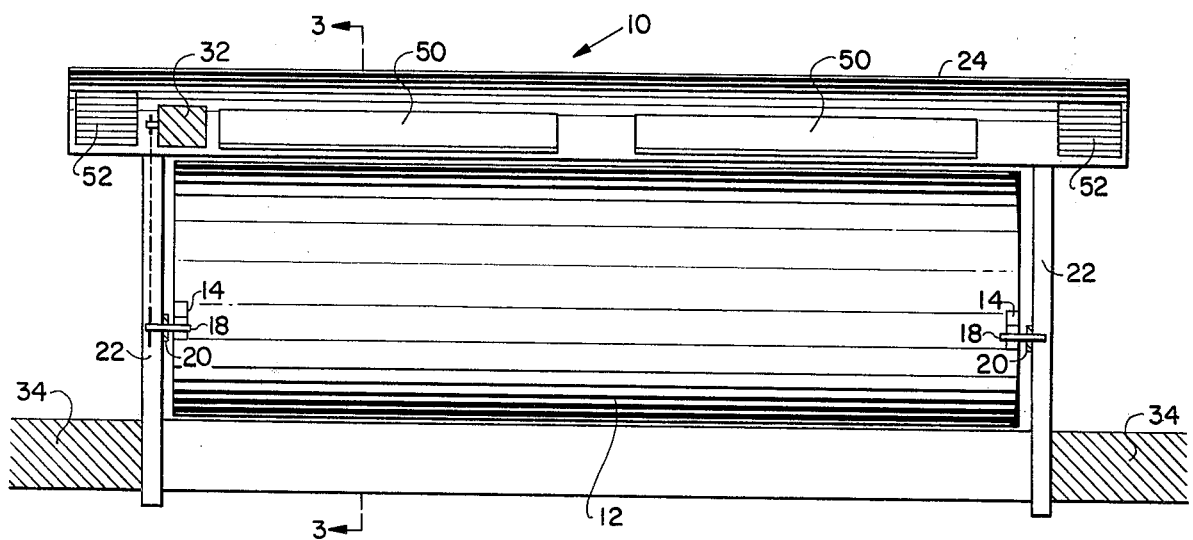
FIG. 2 is a longitudinal cross-sectional view of the invention illustrated in FIG. 1.

During the course of this description like numbers will be used to indicate like elements according to the different figures which illustrate the invention.

The preferred embodiment 10 of the invention includes an insulating and reflective shutter 12 supported by a pair of pivot arms 14 on either side thereof. Shutter 12 is counterbalanced by weights 16 and the whole rotating mechanism is therefore balanced as it moves about the pivot axis of pivot shafts 18. Ball bearings 20 or other similar mountings are used to facilitate this movement and to connect pivot shafts 18 to the end walls 22. Shutter 12 is contained within the skylight housing 11 consisting of the two end walls 22, a top section 24, two bottom sections 26, south glazing 28, and north glazing 30. The position of shutter 12 is controlled by a gear motor and drive assembly 32. Alternatively, a pulley and chain loop (not shown) could be used for manual control. The entire apparatus 10 is mounted on an east-west axis of the roof 34 of a structure.

Shutter 12 should be lightweight and sturdy, preferably constructed of a foam core covered with a reflective aluminum skin. Shutter 12 provides for thermal insulation as well as reflectivity. Similarly, the top section 24, the bottom sections 26, and the end walls 22 should also be insulated and reflective.

Figure 3A:
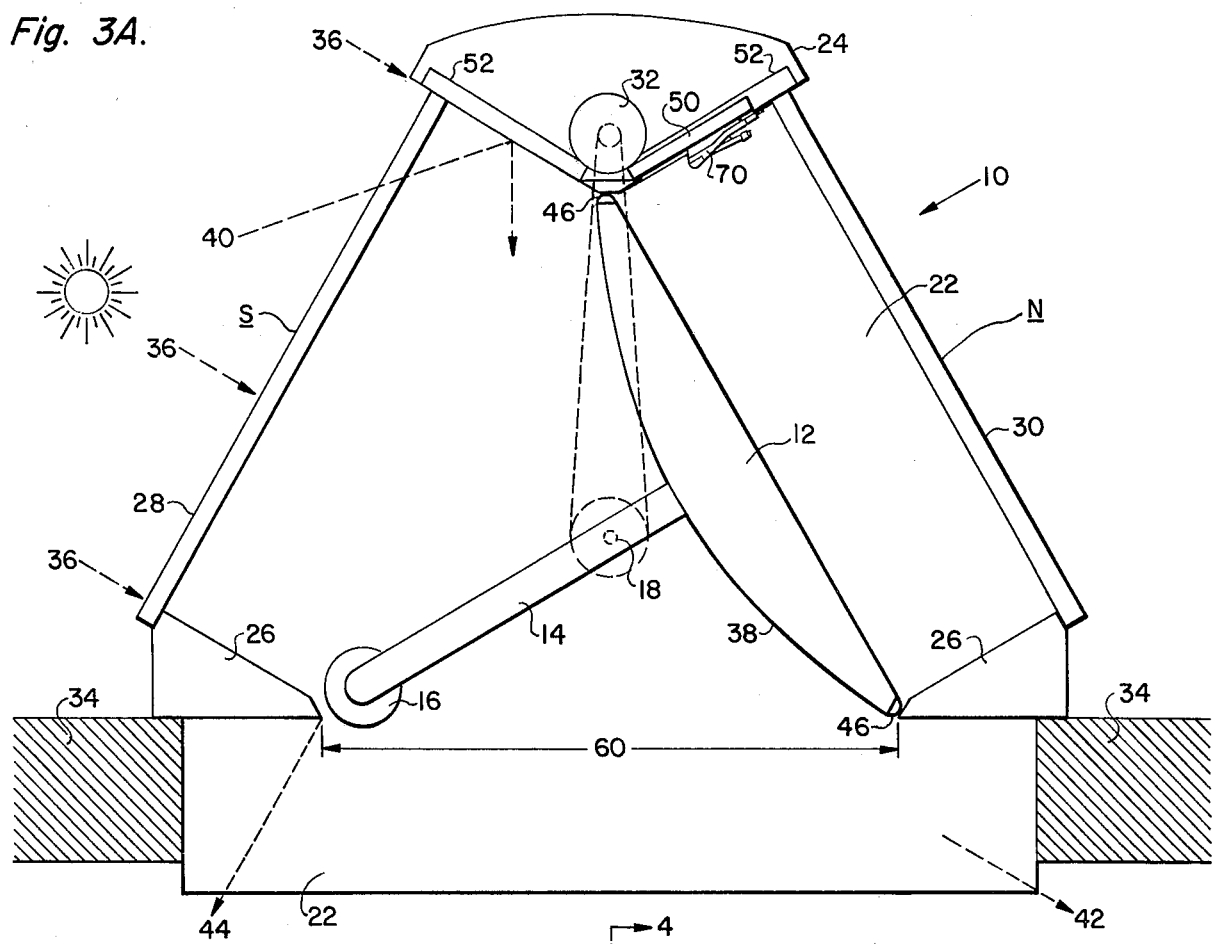
FIG. 3A is a cross-sectional view of the invention illustrating the position of the shutter in the winter day mode.

The operation of the invention 10 can be understood in detail by referring to FIGS. 3A, 3B, 3C and 4. FIG. 3A illustrates apparatus 10 during the daytime of the heating season of the structure. This is the winter day mode. In this mode, shutter 12 is in a position which allows the low winter sunlight 36 to penetrate the south glazing 28. Approximately one-half of this incoming solar energy passes directly to the interior of the structure. The other half is reflected by the convex reflective surface 38 of shutter 12 to the interior of the structure through the open downward face 60 of the housing. Likewise, the reflected sunlight 40 from roof 34 reflects from the lower surface of the top section 24 and is directed towards the interior. This provides a wide spread of solar energy paths 42 and 44 into the interior of the structure 34 for both heat and daylighting. The insulated shutter 12 seals against the upper section 24, the bottom section 26, and the end walls 22 of the skylight housing 11 by means of a flexible vinyl bulb 46 or other similar form of weatherstripping. Seal 46 minimizes convective heat loss between the heated interior of the structure 34 and the colder northern side of the skylight housing 11.

Figure 3B:
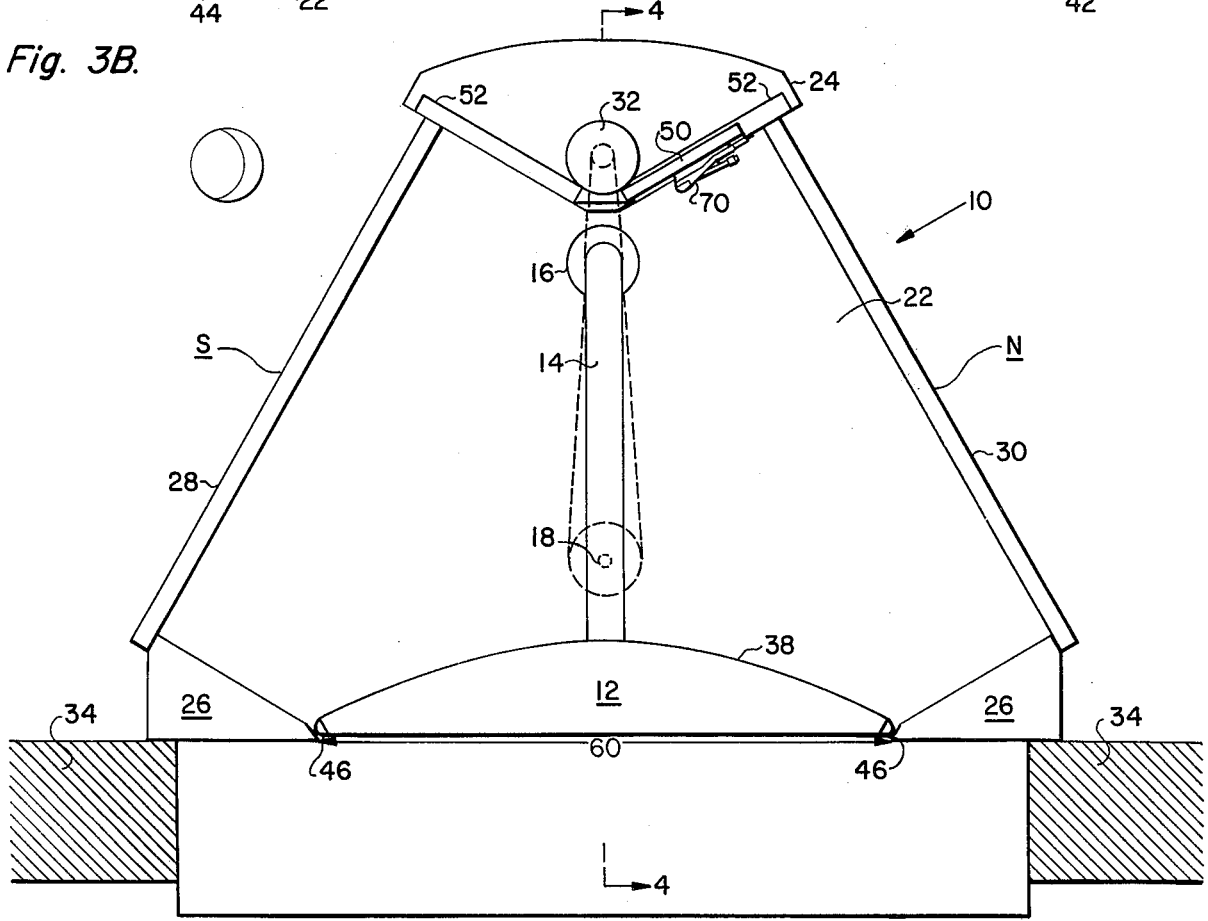
FIG. 3B is a cross sectional view of the invention showing the shutter in the winter night mode.

FIG. 3B illustrates the invention 10 during the night time of the heating season. This is the winter night mode. Under these conditions the shutter 12 is rotated to a position which seals off the open downward face 60 between the two bottom sections 26 of the housing 11. The thermal insulation of the bottom sections 26 and shutter 12 in combination with the seal of the weatherstripping 46 provides an effective thermal barrier against heat loss from the interior of structure 34.

Figure 3C:
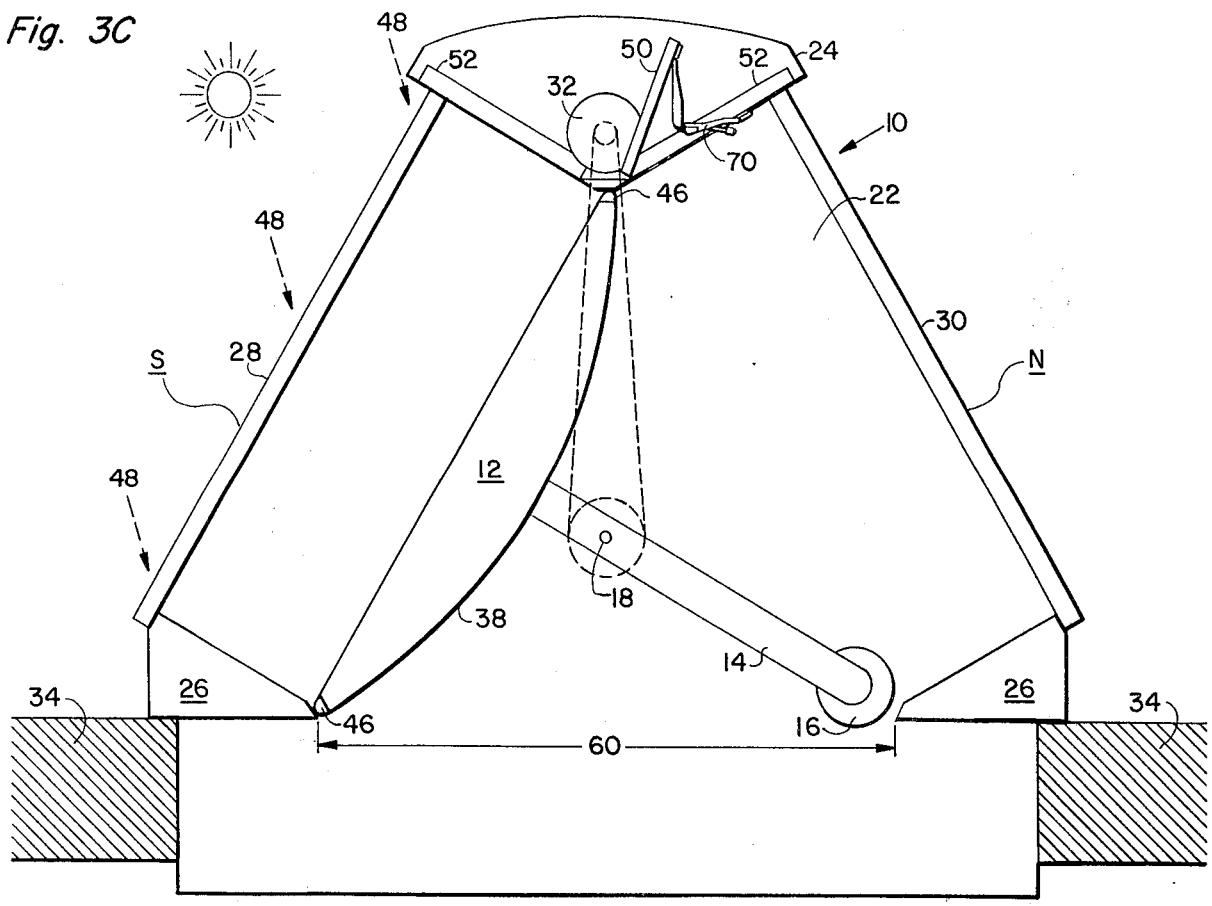
FIG. 3C is a cross-sectional view of the invention showing the shutter in the summer mode.
Figure 4:
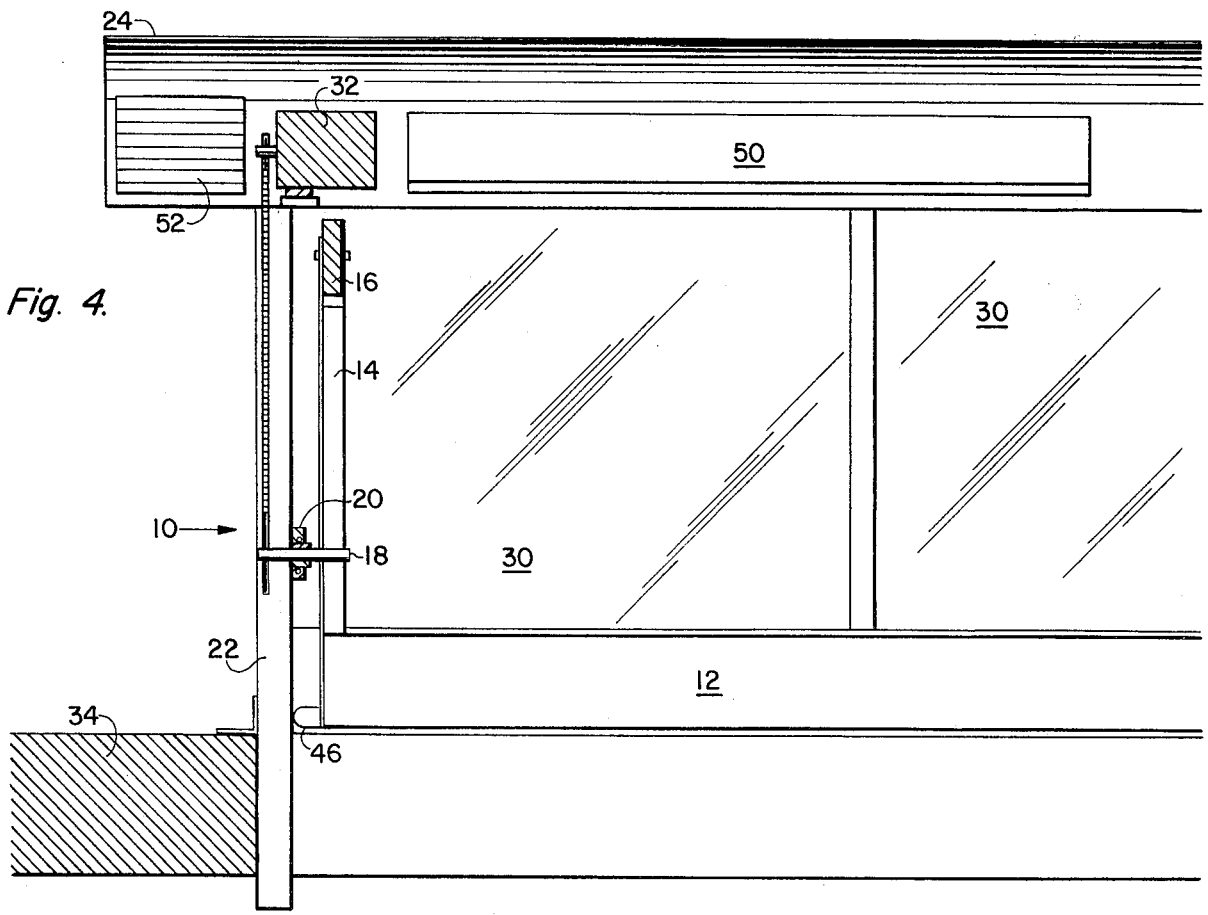
FIG. 4 is a partial cross-sectional view of the invention illustrating the drive mechanism and the shutter/housing sealing mechanism.

FIG. 3C illustrates the invention 10 during the non-heating season of structure 34. This is the summer mode. Under these conditions the shutter 12 is rotated to a position which allows diffuse northern light to penetrate through the north glazing 30 but prevents direct sunlight 48 from passing to the interior. This provides daylight into the interior of the structure 34 without the attendant heat gain of direct sunlight 48. Vent panels 50 automatically open within a pre-set temperature range to allow excessively heated interior air to pass to the outside via the louvered openings 52 at either end of the top section 24. Vent panels 50 are activated automatically by thermal sensitive vent control mechanisms 70, based upon the principle of a thermally expansive fluid driving a piston, or a thermally expansive spring driving a push rod. There are several automatic vent controllers available commercially as greenhouse vent openers. See for example, the Solarvent produced by Dalen Products, Inc. or the Thermofor ® produced by The Bramen Company, Inc.

The invention described is believed to be more economical and effective than other skylight devices known in the prior art. There are also some modifications that could be made to the basic invention. For example, the housing 11 is roughly triangular in shape. However, a circular type housing could also be used, even though the approach is believed to be more expensive. There are a large variety of materials, such as Mylar that could be used as the skin for the reflective surface of shutter 12. Other reflective materials are known to those of ordinary skill in that art that might also be suitable. While one embodiment 10 has been described in detail, it will be appreciated that a plurality of skylights 10 could be used on the same structure 34. In addition, the length of the shutter could vary significantly from application to application, depending in large part, on the nature of the structure to be serviced.

Another advantage the invention has over other systems is balanced rotation. The drive mechanism (either motor or manual) substantially only needs to overcome the inertia of the shutter and friction of the seals in order to position it. This means less effort on the part of the user and the possibility of linking up several units with the same drive mechanism.

While the invention has been described with reference to the preferred embodiment 10 thereof, it will be appreciated by those of ordinary skill in the art that various changes could be made to the structure and function of the elements without departing from the spirit and scope of the basic invention.

I claim:

1. A skylight apparatus comprising:
   a housing means having at least three faces including a northern face, a southern face and a downward face, said housing means also including a long central axis substantially parallel to the planes of said three faces;
   a three position shutter means for reflecting sun from said northern face to said downward face during a winter day and for reflecting the summer sun back through said southern face during a summer day and for blocking off said downward face during the winter night, said shutter means including at least two faces;
   pivot means attached to said housing for carrying said shutter means in such a manner that said shutter means can rotate about a single axis parallel to the long central axis of said housing means; and,
   counterweight means attached to said shutter means, wherein said counterweight means and said shutter means are substantially balanced so that said shutter means can rotate about said single axis parallel to the long central axis of said housing means in a substantially effortless manner.

2. The apparatus of claim 1 wherein at least one of said faces of said shutter means comprises a substantially convex reflective surface.

3. The apparatus of claim 2 further comprising:
   motor means for driving said shutter means.

4. The apparatus of claim 3 wherein said housing means includes a glazed means for substantially covering said northern face; and,
   another glazed means for substantially covering said southern face,
   wherein said downwardly facing face is substantially open and said housing has a cross-section substantially in the form of a triangle.

5. The apparatus of claim 4 further including:
   ventilating means for allowing heated air to rise through said downward face and selectively pass through said housing when said shutter is in the position that it reflects the southern sun and the interior temperature falls within a certain predetermined range.

6. The apparatus of claim 5 further including:
   reflective surface means attached to the top of said housing for reflecting indirect sunlight downwardly through said downward face.

7. The apparatus of claim 6 further including:
   seal mean attached to the edges of said shutter means for sealing the gap between said shutter means and said housing means.

8. A three-way skylight apparatus comprising:
   a triangular housing means having three faces in planes approximately 60° apart from each other, said faces including a northern face, a southern face and a downward face, said housing means including a long central axis running the length of said housing means and being substantially parallel to the planes of said three faces;
   a three-position shutter means including at least two faces, one of which comprises a substantially convex reflective surface, said shutter means mounted for rotation so that in a first position said shutter means reflects sun from said northern face through said downward face during the winter day and in a second position reflects the summer sun back through said southern face during the summer day and in a third position blocks off the downward face during the winter night, said three shutter positions being located substantially at 60° with respect to each other;

pivot means attached to said housing means for carrying said shutter means so that said shutter means can rotate about a single axis substantially parallel to the long central axis of said housing means; and, counterweight means attached to said shutter means, wherein said counterweight means and shutter means are substantially balanced so that said shutter means can rotate about said single axis substantially parallel to the long central axis of said housing means in a substantially effortless manner.

* * * * *